(12) United States Patent
Canfield et al.

(10) Patent No.: US 6,412,479 B1
(45) Date of Patent: Jul. 2, 2002

(54) THERMAL MANAGEMENT SYSTEM FOR POSITIVE CRANKCASE VENTILATION SYSTEM

(75) Inventors: James Carl Canfield, Lake Orion; Michael L. Dougherty, Sr., Rochester Hills; James Allen Beyer; Dale Linwood Sleep, both of Clarkston, all of MI (US)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 09/885,743

(22) Filed: Jun. 20, 2001

(51) Int. Cl.⁷ ............................................. F02M 25/00
(52) U.S. Cl. ...................................................... 123/573
(58) Field of Search .................................. 123/572, 573, 123/574, 41.86

(56) References Cited

U.S. PATENT DOCUMENTS

| | | |
|---|---|---|
| 3,779,221 A * | 12/1973 | Gartner ....................... 123/572 |
| 3,943,889 A | 3/1976 | Sparber |
| 3,963,010 A | 6/1976 | Harned |
| 3,965,681 A | 6/1976 | Wyczalek et al. |
| 4,098,236 A | 7/1978 | Okawa |
| 4,107,922 A | 8/1978 | Wossner |
| 4,146,176 A | 3/1979 | Beauvais et al. |
| 4,186,705 A | 2/1980 | Abthoff et al. |
| 4,254,821 A | 3/1981 | Matsuda et al. |
| 4,450,798 A | 5/1984 | Jessel |
| 4,491,101 A | 1/1985 | Strumbos |
| 4,497,305 A | 2/1985 | Ozawa |
| 4,667,876 A | 5/1987 | Negishi |
| 4,688,537 A | 8/1987 | Calkins et al. |
| 4,715,183 A | 12/1987 | Meijer et al. |
| 4,753,072 A | 6/1988 | Johansson et al. |
| 4,768,493 A | 9/1988 | Ohtaka et al. |
| 4,773,473 A | 9/1988 | Konitzer |
| 4,775,102 A | 10/1988 | Negishi et al. |
| 4,871,049 A | 10/1989 | Okita |
| 4,972,812 A | 11/1990 | Strumbos |
| 4,974,667 A | 12/1990 | Sun et al. |
| 5,024,300 A | 6/1991 | Miller et al. |
| 5,082,174 A | 1/1992 | Joji |
| 5,090,896 A | 2/1992 | Kenner et al. |
| 5,454,351 A | 10/1995 | Cao et al. |
| 5,588,483 A | 12/1996 | Ishida |
| 5,647,429 A | 7/1997 | Oktay et al. |
| 5,727,619 A | 3/1998 | Yao et al. |
| 5,826,645 A | 10/1998 | Meyer, IV et al. |
| 5,850,741 A | 12/1998 | Feher |
| 5,960,866 A | 10/1999 | Kimura et al. |
| 5,964,279 A | 10/1999 | Mochizuki et al. |
| 5,970,962 A | 10/1999 | Nelson et al. |
| 5,983,995 A | 11/1999 | Shutou et al. |
| 6,052,285 A | 4/2000 | Hileman |
| 6,062,206 A | 5/2000 | Nelson et al. |
| 6,070,654 A | 6/2000 | Ito |
| 6,076,595 A | 6/2000 | Austin et al. |
| 6,111,750 A | 8/2000 | Gates |
| 6,125,035 A | 9/2000 | Hood, III et al. |
| 6,234,154 B1 * | 5/2001 | Spix ........................... 123/572 |

* cited by examiner

Primary Examiner—Marguerite McMahon
(74) Attorney, Agent, or Firm—Dykema Gossett PLLC

(57) ABSTRACT

A thermal management system for a positive crankcase ventilation (PCV) system of an engine is provided. The inventive system includes a heat pipe having one end coupled to a heat source such as the cylinder head of the engine. The heat pipe is then configured to be in thermal contact with one or more components of the PCV system, such as the PCV valve or a hose. The present invention further provides a vehicle subassembly comprising a PCV valve and a heat pipe routed through the PCV valve. The subassembly may further include a hose coupled to the PCV valve.

20 Claims, 4 Drawing Sheets

THERMAL MANAGEMENT SYSTEM FOR POSITIVE CRANKCASE VENTILATION SYSTEM

BACKGROUND OF THE INVENTION

1. Field of the Invention

This invention relates to a positive crankcase ventilation system for use in an internal combustion engine and, in particular, to a device for thermal management of the positive crankcase ventilation system.

2. Disclosure of Related Art

Conventional gasoline and diesel internal combustion engines often employ a positive crankcase ventilation (PCV) system. During the final stages of combustion in the engine, gaseous mixtures of unburned fuel, air, and other constituent products of combustion often leak past piston rings disposed within the engine's cylinders. These gaseous mixtures, commonly referred to as "blowby-gases," will interfere with engine performance if allowed to remain within the crankcase. The blow-by-gases include toxic byproducts of the combustion process, however, and it is therefore undesirable to vent the gases directly into the atmosphere. The PCV system employs an engine vacuum to draw blow-by-gases into the engine intake manifold for reburning in the combustion chambers and controls the flow of the blow-by-gases.

Among other constituent elements, blow-by-gases contain high levels of water vapor. During a variety of operating conditions this water vapor can freeze, forming snow and ice within the PCV system, including the PCV valve, ventilation lines, and other locations. Freezing can occur, for example, when the vehicle engine is started from a cold start in low ambient temperatures (e.g. less than 35° F) or as a result of the effects of wind chill during motion of the vehicle, which can affect the vapor lines exposed to the ambient environment. In the latter case, freezing in the PCV system has been found to occur even at relatively high ambient temperatures when the vehicle is traveling at a relatively high rate of speed with little load on the engine, for example, when the vehicle coasts or idles down an incline. Frozen accumulations in the PCV system can cause catastrophic failures of the engine, such as engine oil blow outs, crankcase seal blow outs, or throttle sticking, all of which have the potential to endanger the driver and vehicle occupants.

Various solutions have been proposed in the prior art to prevent the freezing of PCV systems. In U.S. Pat. No. 4,768,493 a system is disclosed in which a water jacket circulates warmed engine coolant around the PCV valve. However, this system and other systems employing engine coolant have several disadvantages. The systems are slow to work during a cold start and fail to provide heat quickly enough to prevent freezing. In addition, these systems remove capacity and related efficiency from the engine cooling system, which is generally carefully designed for the engine. Finally, these systems are relatively expensive and complex and add unnecessary weight to the vehicle. In U.S. Pat. Nos. 5,970,962 and 6,062,206 electric heaters are disclosed for heating the PCV system. Electric heaters, however, drain power from the electrical system of the vehicle. The heaters are also relatively expensive and labor-intensive with respect to manufacture and installation. In addition, the above-identified solutions and other solutions are not completely effective in overcoming the effects of wind chill which vary widely responsive to factors such as ambient temperature, the moisture content of the environment, and the velocity of the air surrounding the PCV system.

Thus, there is a need for a more effective thermal management device for a PCV system that will minimize or eliminate one or more of the above-mentioned deficiencies.

SUMMARY OF THE INVENTION

The present invention provides a thermal management device for a PCV system of an engine including, but not limited to a vehicle engine.

A thermal management device for a PCV system of an engine in accordance with the present invention includes a heat pipe having first and second ends. One end of the heat pipe is configured for connection to a heat source. The heat source may, for example, comprise a cylinder head of an internal combustion engine. The heat pipe is further configured to be in thermal contact with one or more components of the PCV system. For example, the heat pipe may be in thermal contact with a PCV valve or a hose coupled to the PCV valve. In accordance with the present invention, the phrase "thermal contact" includes placement sufficient to permit thermal conduction, convection, and/or radiation.

The present invention also provides a PCV subassembly for assembly with an engine. The subassembly includes a PCV valve and a heat pipe. One end of the heat pipe is configured for connection to a heat source in the engine and the heat pipe is configured to be in thermal contact with the PCV valve.

A thermal management device in accordance with the present invention has several advantages as compared to conventional devices for regulating temperatures within PCV systems. First, the inventive system device works quickly, as heat pipes can rapidly transfer heat. Additionally, the inventive system requires no external energy to operate it only requires a temperature difference to be operational, such temperature differences being readily available within an engine system. The inventive system also does not cause parasitic losses in the automobile electrical system or engine coolant system. Finally, the inventive system is also capable of preventing freezing of the PCV system in widely varying conditions.

These and other features and objects of this invention will become apparent to one skilled in the art from the following detailed description and the accompanying drawings illustrating features of this invention by way of example.

DETAILED DESCRIPTION OF THE PREFERRED EMBODIMENT

Figure 1:
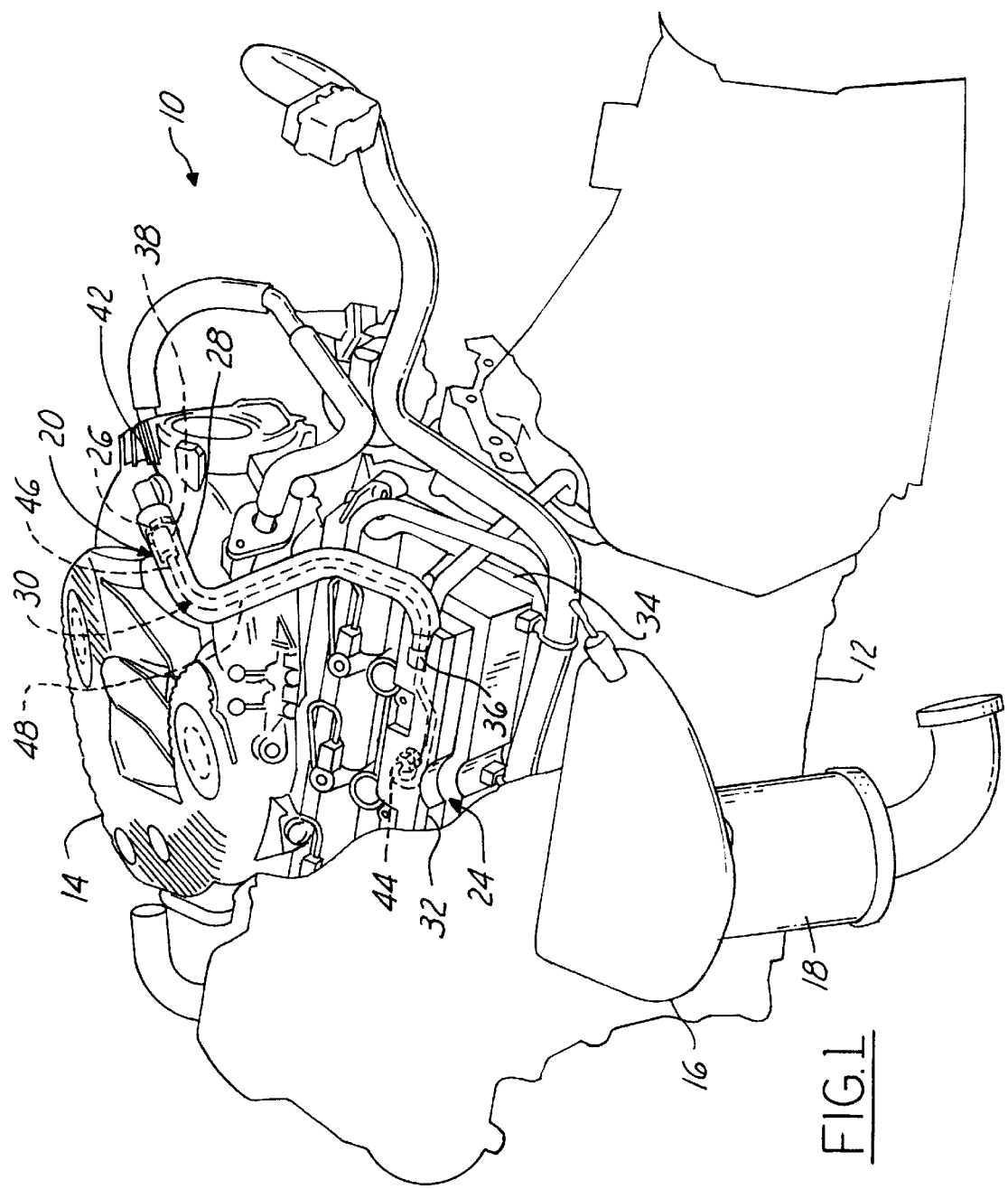
FIGS. 1 and 2 are perspective views of an engine including a device for thermal management of a PCV system of the engine in accordance with the present invention.
Figure 2:
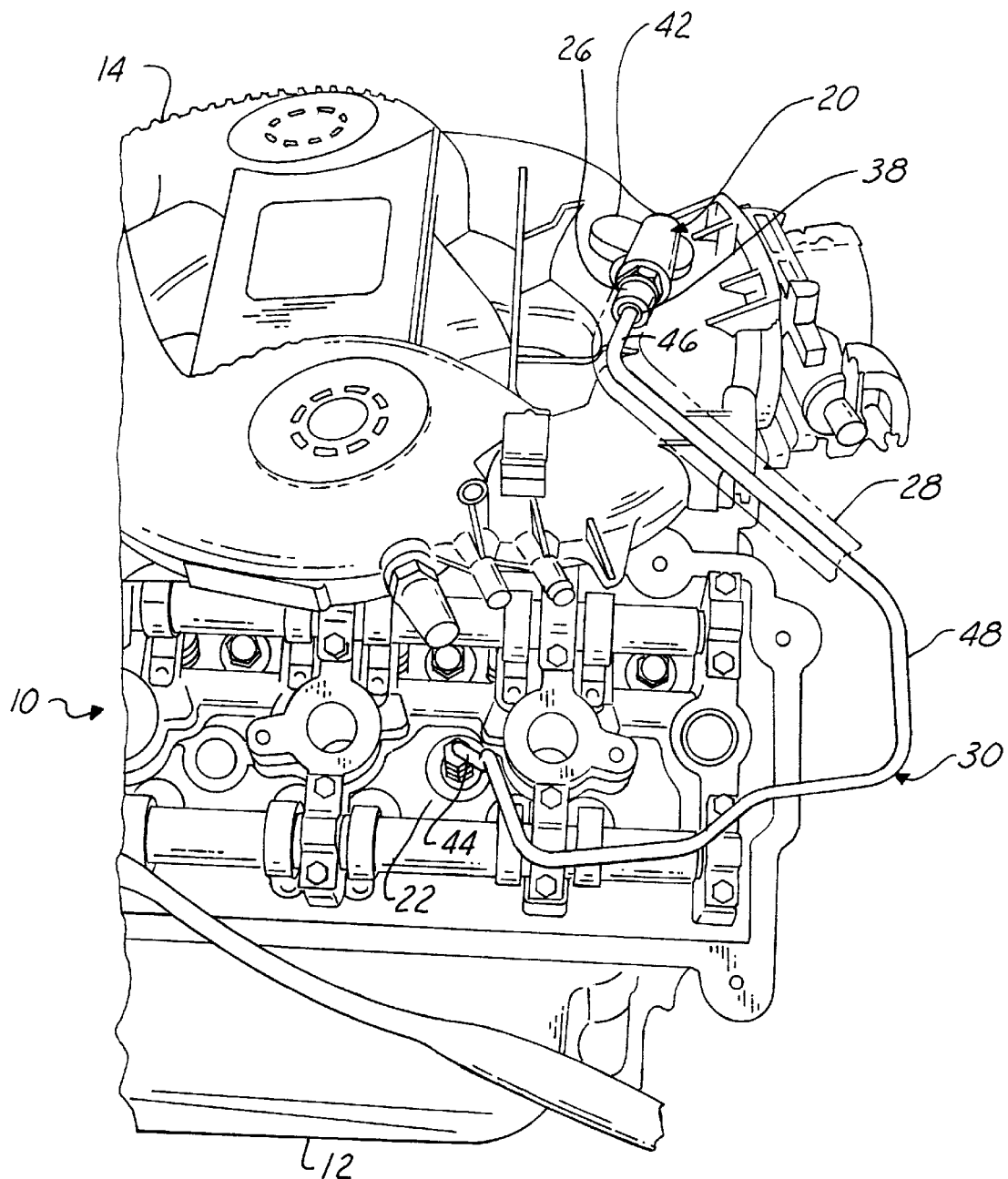

Referring now to the drawings wherein reference numerals are used to identify identical components in the various views, FIGS. 1–2 illustrate a conventional internal combustion engine 10. In the illustrated embodiment, engine 10 comprises a gasoline engine for a vehicle. It should be understood by those of skill in the art, however, that the present invention may find application in a wide variety of conventional engines including, for example, diesel fueled engines and in a wide variety of non-vehicular applications (e.g., lawnmowers or electric generators) using internal combustion engines, diesel engines, or other types of engines. Engine 10 may include an engine block 12, an air intake manifold 14, an exhaust manifold 16, a catalytic converter 18, and a PCV system 20.

With continued reference to FIG. 1, engine block 12 provides structural support for the working components of engine 10 and defines a space for the combustion process to take place. Block 12 is conventional in the art and may be made of cast iron or aluminum. Block 12 defines a plurality of cylinders (not shown). A cylinder head 22 may be bolted or otherwise coupled to block 12 to seal the cylinders. Each cylinder forms a combustion chamber in which fuel provided by a carburetor or fuel injector (not shown) and air received from intake manifold 14 are burned after ignition through an electric spark provided by a spark plug (not shown). Pistons (not shown) are moved within the cylinders responsive to an expansion force of the air-fuel mixture and drive a crankshaft (not shown) to which the pistons are coupled.

Intake manifold 14 is provided to distribute air, or an air/fuel mixture, from a throttle body (not shown) to each cylinder in engine block 12. Intake manifold 14 is conventional in the art and includes an air intake (not shown) coupled to the throttle body and a plurality of runners (not shown) that distribute air from the intake tank to air intake valves (not shown) associated with the cylinders. Intake manifold 14 is also coupled to PCV system 20 to allow blow-by-gases to be redirected to the combustion chambers.

Exhaust manifold 16 is provided to direct exhaust gases resulting from the combustion process from the cylinders to an exhaust pipe (not shown). Exhaust manifold 16 is conventional in the art.

Catalytic converter 18 provides emission control to reduce pollutants in the exhaust gases. Converter 18 is conventional in the art and may consist of a ceramic structure coated with a metal catalyst, such as platinum, rhodium and/or palladium, over which exhaust gases pass. In the illustrated embodiment, converter 18 is located adjacent to exhaust manifold 16. It will be understood by those in the art, however, that converter 18 may also be built within exhaust manifold 16.

PCV system 20 is provided to route blow-by-gases from the engine crankcase environment back into the engine combustion chambers. PCV system 20 may include an engine valve cover 24, a PCV valve 26, and a hose 28. In accordance with the present invention, PCV system 20 also includes a device for thermal management of system 20. In particular, system 20 includes a heat pipe 30.

Figure 4:
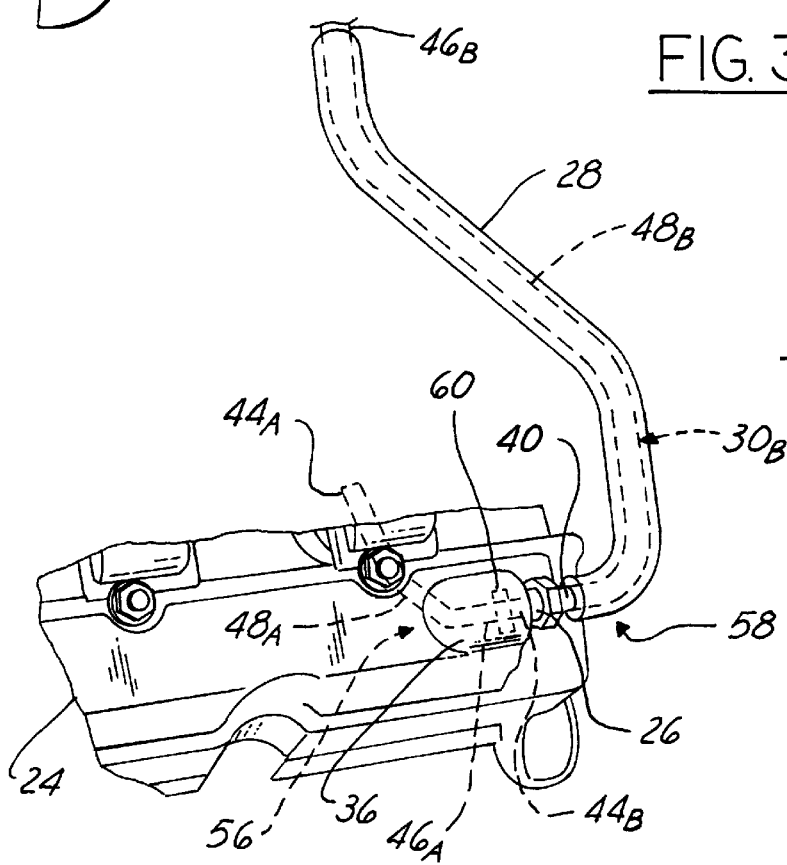
FIG. 4 is a perspective view of a portion of a PCV subassembly in accordance with the present invention.

Valve cover 24 provides a housing that covers the valve train of engine 10 and traps blow-by-gases exiting the engine cylinders. Valve cover 24 is conventional in the art and may include a dome-shaped portion 32 and a peripheral flange 34 that is mounted to cylinder head 22. It should be understood by those of skill in the art that the size, shape, and configuration of valve cover may vary responsive to design considerations associated with the other components of engine 10. Valve cover 24 includes an outlet 36 through which the blow-by-gases are routed to PCV valve 26 and may also include a convention oil separator (not shown). PCV valve 26 is provided to regulate the flow of blow-by-gases entering intake manifold 14 responsive to the vacuum force created by manifold 14. Valve 26 is also conventional in the art. In the illustrated embodiment, PCV valve 26 is coupled directly to intake manifold 14 and hose 28 extends between outlet 36 of valve cover 24 and an inlet port 38 of PCV valve 26. Referring to FIG. 4, however, PCV valve 26 may alternatively be coupled directly to outlet 36 of valve cover 24 and hose 28 may extend between an outlet port 40 of PCV valve 26 and an inlet 42 (shown in FIGS. 1 and 2) of intake manifold 14. It will be understood by those of skill in the art that the configuration of PCV valve 26 may be varied without departing from the spirit of the present invention. For example, PCV valve 26 could itself be configured to extend between valve cover 24 and intake manifold 14 thereby eliminating hose 28.

Hose 28 is provided to route blow-by-gases between components of PCV system 20. Hose 28 is conventional in the art and may be made from rubber and other conventional materials. In the illustrated embodiment, hose 28 extends from valve cover 24 to an inlet port 38 of PCV valve 26. As set forth hereinabove, however, and with reference to FIG. 4, hose 28 may alternatively extend from an outlet port 40 of PCV valve 26 to an inlet 42 in intake manifold 14 (not shown).

In accordance with the present invention, heat pipe 30 is provided for heating one or more portions of PCV system 20. Various structures for heat pipes are well known and reference may be had to G.P. PETERSON, AN INTRODUCTION TO HEAT PIPES: MODELING, TESTING AND APPLICATIONS (1994), the entire disclosure of which is incorporated herein by reference. Heat pipe 30 includes a first end 44 and a second end 46. One of the ends 44, 46 of heat pipe 30 (end 44 in the illustrated embodiment) comprises an evaporator while the other of ends 44, 46 (end 46 in the illustrated embodiment) comprises a condensor. Heat pipe 30 further includes a transition portion 48 extending between ends 44, 46.

Figure 3:
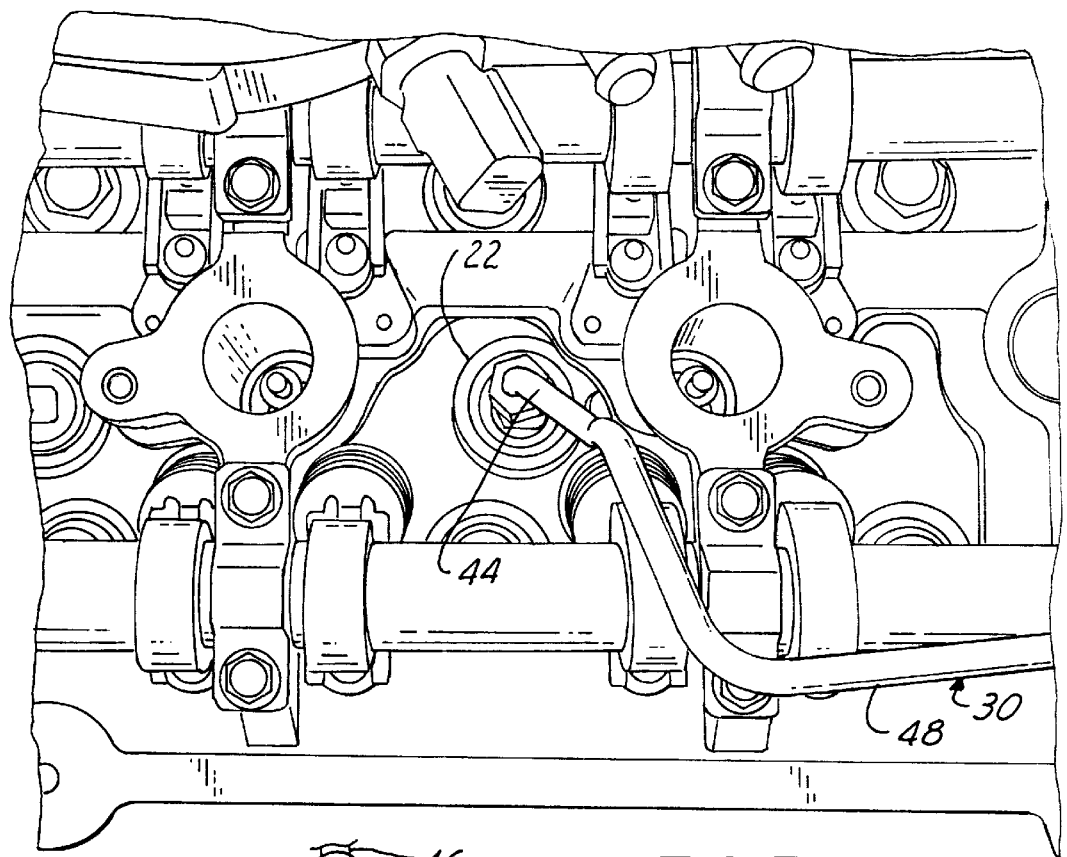
FIG. 3 is a top view of a portion of the engine and device of FIGS. 1 and 2.
Figure 5:
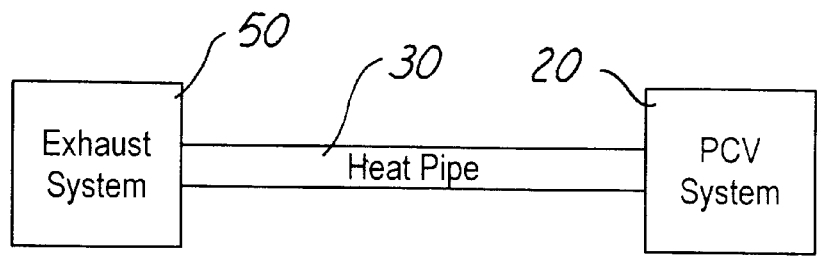
FIG. 5 is a block diagram illustrating the use of an exhaust system component as a heat source for a thermal management device in accordance with the present invention.
Figure 6:
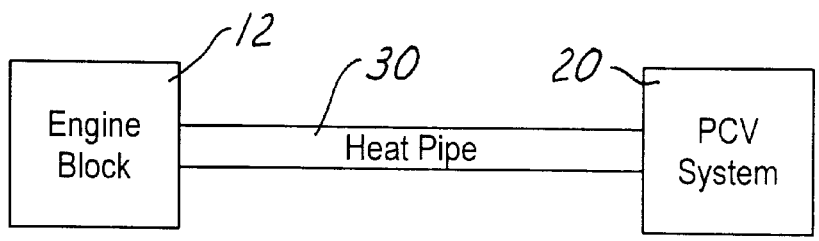
FIG. 6 is a block diagram illustrating the use of an engine block component as a heat source for a thermal management device in accordance with the present invention.
Figure 7:
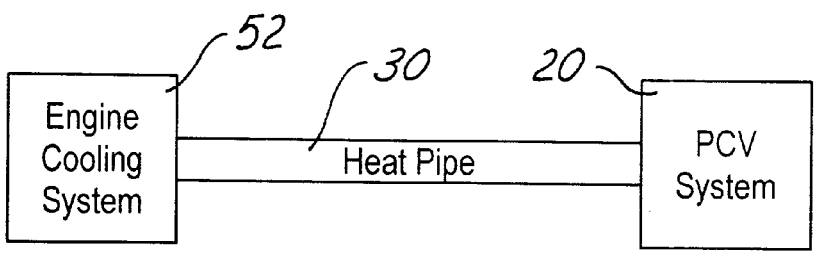
FIG. 7 is a block diagram illustrating the use of an engine cooling system component as a heat source for a thermal management device in accordance with the present invention.
Figure 8:
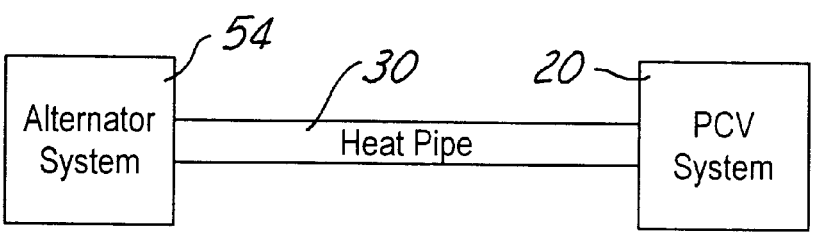
FIG. 8 is a block diagram illustrating the use of an alternator system component as a heat source for a thermal management device in accordance with the present invention.

End 44 is provided to obtain heat from a heat source and is configured to be in thermal contact with a heat source. Referring to FIG. 3, in one embodiment of the invention, the heat source comprises cylinder head 22. End 44 is placed in thermal contact with cylinder head 22 (and particularly to a plug in cylinder head 22) so that heat from one or more combustion chambers of engine block 12 is transferred to heat pipe 30 through conduction, convection, and/or radiation. The heat source may comprise any of a large number of components within, or associated with, engine 10 and its application environment. Referring to FIG. 5, for example, the heat source may comprise a component of the exhaust system 50 such as exhaust manifold 16, catalytic converter 18, exhaust pipe, or an exhaust gas recirculation (EGR) valve. Referring to FIG. 6, the heat source may alternatively comprise virtually any location on engine block 12. Referring to FIG. 7, the heat source may also comprise a component of the engine cooling system 52. Referring to FIG. 8, the heat source may comprise a component of an alternator system 54, such as the alternator itself. In a preferred embodiment, the heat source comprises a source of otherwise wasted heat within, or associated with, engine 10 or its application environment. It should be understood, however, that the heat source may alternatively comprise a source specifically provided to generate heat for PCV system 20.

End 46 of heat pipe is configured to be in thermal contact with one or more components of PCV system 20 to thereby transfer heat to the component(s) by conduction, convection, and/or radiation. In the illustrated embodiment, end 46 is configured to be in thermal contact with PCV valve 26 of system 20 and to transfer heat to valve 26 through conduction. Alternatively, however, end 46 may be in thermal contact with hose 28, or any other component of system 20.

Transition portion 48 is provided to transfer heat from end 44 of heat pipe 30 (which is in thermal contact with a heat source) to end 46 of heat pipe 30 (which is in thermal contact with components of PCV system 20 to be heated). Portion 48 may be shaped as required to transfer heat among the components of PCV system 20. In the illustrated embodiment, transition portion 48 is shaped such that transition portion 48 extends from end 44 of heat pipe 30, through outlet 36 in valve cover 24, through hose 28, and in or near an inlet 38 of PCV valve 26. In accordance with known structures for heat pipes, transition portion 48 may include a sealed container, a working fluid, and a capillary wick. The sealed container holds both the working fluid and capillary wick. The wick is uniformly held against the inside of the container. Applying heat to end 44 of heat pipe 30 evaporates working fluid. The gaseous fluid is at a pressure greater than the liquid fluid, and moves through the transition portion 48, within the container, to end 46 of heat pipe 30 (which is at a lower temperature relative to end 44) and condenses thereby releasing its latent heat of vaporization. The condensed fluid enters the wick as a liquid and is drawn by capillary action to end 44 of heat pipe (which is at a higher temperature relative tolend 46). It should be understood, however, that heat pipe 30 may assume a variety of conventional structures known in the art.

Referring to FIG. 4, the components of system 20 may be combined into one or more subassemblies, such as subassemblies 56, 58, in accordance with the present invention for installation and assembly with engine 10. Subassemblies such as subassemblies 56, 58 are advantageous because they enable more rapid assembly of engine 10 and the machines incorporating such engines and thereby reduce the cost to original equipment manufacturers. It should be understood that each subassembly may itself be comprised of multiple subassemblies.

Subassembly 56 may comprise a heat pipe $30_A$ and a connector 60. Heat pipe $30_A$ includes ends $44_A$, $46_A$, and a transition portion $48_A$. End $44_A$ of heat pipe $30_A$ may be configured for connection to a heat source such as cylinder head 22 (see FIG. 3). Transition portion $48_A$ of heat pipe $30_A$ is then routed through an outlet 36 in valve cover 24. The connector 60 may be disposed about heat pipe $30_A$ proximate end $46_A$ of heat pipe $30_A$.

Subassembly 58 may include PCV valve 26, hose 28, and a heat pipe $30_B$. In the illustrated embodiment, an inlet port of PCV valve 26 is coupled to outlet port 36 of engine valve cover 24 and an outlet port of PCV valve 26 is coupled to hose 28. The other end of hose 28 may be adapted for coupling to an inlet 42 in intake manifold 14. Alternatively, hose 28 may extend between outlet port 36 of valve cover 24 and an inlet port of PCV valve 26 while the outlet port PCV valve 26 may be coupled to inlet 42 of intake manifold 14 (as shown in FIGS. 1 and 2). Like heat pipe $30_A$, heat pipe $30_B$ includes ends $44_B$, $46_B$, and a transition portion $48_B$. End $44_B$ is configured for connection to a heat source. In the illustrated embodiment, the heat source comprises end $46_A$ of heat pipe $30_A$. It should be understood, however, that the heat source could alternatively comprise cylinder head 22 or a component of the exhaust system 50 or other sources of heat as discussed hereinabove. In the illustrated embodiment, end $44_B$ of heat pipe $30_B$ is held in thermal contact with end $46_A$ of heat pipe $30_A$ through connector 60 of subassembly 56. Ends $44_B$, $46_A$ may be connected within PCV valve 26 or outside of valve 26 as shown in the illustrated embodiment. Transition portion $48_B$ extends from $44_B$ through hose 28 to end $46_B$. End $46_B$, may be in thermal contact with hose 28 and/or inlet 42 of intake manifold 14.

The present invention represents a significant improvement as compared to conventional thermal management techniques for PCV systems. First, the present invention rapidly transfers heat to the PCV system, thereby eliminating problems encountered in prior art systems during cold starts. Second, the present invention does not reduce efficiencies in the cooling and/or electrical systems of the vehicle. Finally, the present invention enables effective thermal management of the PCV system despite the wide ranging variables associated with wind chill.

While the invention has been particularly shown and described with reference to the preferred embodiments thereof, it is well understood by those skilled in the art that various changes and modifications can be made in the invention without departing from the spirit and scope of the invention.

We claim:
1. A device for thermal management of a positive crankcase ventilation system of an engine, comprising:
   a heat pipe having a first end and a second end, said first end configured for connection to a heat source
   wherein a portion of said heat pipe is configured to be in thermal contact with a component of said positive crankcase ventilation system.
2. The device of claim 1 wherein said heat source comprises a cylinder head of said engine.
3. The device of claim 1 wherein said heat source comprises a component of an exhaust system of said engine.
4. The device of claim 1 wherein said heat source comprises a component of a cooling system of said engine.
5. The device of claim 1 wherein said component comprises a positive crankcase ventilation valve.
6. The device of claim 1 wherein said component comprises a hose coupled to a positive crankcase ventilation valve.
7. A device for thermal management of a positive crankcase ventilation system of an engine, comprising:
   a heat pipe comprising
      an evaporator configured for connection to a heat source;
      a condenser; and,
      a transition portion extending between said evaporator and said condenser;
   wherein said condenser is configured to be in thermal contact with a component of said positive crankcase ventilation system.
8. The device of claim 7 wherein said heat source comprises a cylinder head of said engine.
9. The device of claim 7 wherein said heat source comprises a component of an exhaust system of said engine.
10. The device of claim 7 wherein said heat source comprises a component of a cooling system of said engine.
11. The device of claim 7 wherein said component comprises a positive crankcase ventilation valve.

12. The device of claim 7 wherein said component comprises a hose coupled to a positive crankcase ventilation valve.

13. The device of claim 7 wherein said transition portion is disposed within a hose coupled to a positive crankcase ventilation valve.

14. A positive crankcase ventilation subassembly for an engine, comprising:
   a positive crankcase ventilation valve; and
   a heat pipe having a first end and a second end, said first end configured for connection to a heat source
   wherein a portion of said heat pipe is configured to be in thermal contact with said positive crankcase ventilation valve.

15. The subassembly of claim 14 wherein said heat pipe extends through said positive crankcase ventilation valve.

16. The subassembly of claim 14, further comprising a hose coupled to said positive crankcase ventilation.

17. The subassembly of claim 16 wherein a portion of said heat pipe is disposed within at least a portion of said hose.

18. The device of claim 14 wherein said heat source comprises a cylinder head of said engine.

19. The device of claim 14 wherein said heat source comprises a component of an exhaust system of said engine.

20. The device of claim 14 wherein said heat source comprises a component of a cooling system of said engine.

* * * * *